(12) United States Patent
Hasegawa

(10) Patent No.: US 6,262,731 B1
(45) Date of Patent: Jul. 17, 2001

(54) INFORMATION PROCESSING APPARATUS AND METHOD

(75) Inventor: Taketo Hasegawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/120,315

(22) Filed: Jul. 22, 1998

(30) Foreign Application Priority Data

Jul. 25, 1997 (JP) .................................................... 9-200573

(51) Int. Cl.[7] ....................................................... G06F 17/00
(52) U.S. Cl. ............................................. 345/339; 345/348
(58) Field of Search .................................... 345/348, 349, 345/352, 353, 356, 357, 339

(56) References Cited

U.S. PATENT DOCUMENTS

| | | | |
|---|---|---|---|
| 5,731,813 | * 3/1998 | O'Rourke et al. | 345/349 |
| 5,813,007 | * 9/1998 | Nielsen | 707/10 |
| 5,917,491 | * 6/1999 | Bauersfeld | 345/348 |
| 6,009,410 | * 12/1999 | Lemole et al. | 707/102 |
| 6,072,486 | * 6/2000 | Sheldon et al. | 345/339 |

* cited by examiner

*Primary Examiner*—Raymond J. Bayerl
*Assistant Examiner*—Cao H. Nguyen
(74) *Attorney, Agent, or Firm*—Fitzpatrick, Cella, Harper & Scinto

(57) ABSTRACT

An information processor obtains information (home page) from an arbitrary information apparatus connected to the information processor via a network, and implements processing in which image data in the home page is extracted and stored so as to be correlated with a Uniform Resource Locator (URL). When the stored image data is designated with a mouse or the like, additional data are received from the information apparatus corresponding to the stored URL correlated with the stored image data, and are displayed. Thereby, image data extracted from a target homepage is used as a bookmark, which enables access to the target homepage, even if the number of bookmarks increases.

20 Claims, 18 Drawing Sheets

(PROCESS FOR OPENING THE SCRAPBOOK)

INFORMATION PROCESSING APPARATUS AND METHOD

BACKGROUND OF THE INVENTION

1. Field of the Invention

The present invention relates to an information processing apparatus and method for displaying received data obtained by performing communication with information apparatuses connected to a network and for implementing control in recording the received data.

2. Description of the Related Art

As a result of the spread of the Internet and intranets, information apparatuses (sites) transmitting various types of information (hereinafter referred to as "homepages") are rapidly increasing. Many tools for reading the homepages are provided. The tools have a function (generally called a "bookmark") of recording the address of a homepage so that an operator can subsequently view the homepage when needed.

In the above-described conventional case, a bookmark is simply used to record the address of a homepage. When subsequently viewing the homepage, the operator may not recognize what the bookmark represents. Accordingly, in many cases, the operator needs to perform communication with the information apparatus corresponding to the bookmark in order to recognize the bookmark from displayed data.

In addition, when the number of bookmarks is very large, it is difficult to find a bookmark representing the desired homepage.

SUMMARY OF THE INVENTION

Accordingly, it is an object of the present invention to provide an information processing apparatus and method which reduces the difficulty in identifying homepages, whereby target information (homepage) can be easily obtained from information apparatuses connected to a network.

In addition, it is another object of the present invention to provide an information processing apparatus and method which reduces image data and extracts only characteristic parts of the information, whereby the number of data capable of being displayed at one time is increased to enable the visual recognition of a plurality of information pieces at one time.

To these ends, according to a first aspect of the present invention, the foregoing objects have been achieved through provision of an information processing apparatus including: first receiving means for receiving input data from an information apparatus via a network; first display means for displaying on a display screen the input data received by the first receiving means; first designating means for designating an arbitrary region of the input data displayed on the display screen; extracting means for extracting as partial data the region designated by the first designating means; storage means for holding the partial data extracted by the extracting means and address data representing the location of the information apparatus on the network so that the input data and the partial data are correlated with each other; second display means for displaying on the display screen the partial data stored in the storage means; second designating means for designating the partial data displayed on the display screen; second receiving means for receiving additional data related to the partial data, from the information apparatus corresponding to the address data correlated with the partial data designated by the second designating means; and third display means for displaying on the display screen the additional data received by the second receiving means.

According to a second aspect of the present invention, the foregoing objects have been achieved through provision of an information processing apparatus including: first receiving means for receiving input data from an information apparatus via a network; first display means for displaying on a display screen the input data received by the first receiving means; forming means for forming reduced data by reducing the input data displayed on the display screen; storage means for storing the reduced data formed by the forming means and address data representing the location of the information apparatus on the network so that the input data and the reduced data are correlated with each other; second display means for displaying on the display screen the reduced data stored in the storage means; designating means for designating the reduced data displayed on the display screen; second receiving means for receiving additional data related to the reduced data, from the information apparatus corresponding to the address data correlated with the reduced data designated by the designating means; and third display means for displaying on the display screen the additional data received by the second receiving means.

According to a third aspect of the present invention, the foregoing objects have been achieved through provision of an information processing apparatus including: first receiving means for receiving input data from an information apparatus via a network; first display means for displaying on a display screen the input data received by the receiving means; first designating means for designating an arbitrary region of the input data displayed on the display screen; extracting means for extracting as partial data the region designated by the first designating means; forming means for forming reduced partial data by reducing the partial data extracted by the extracting means; storage means for storing the reduced partial data formed by the forming means and address data representing the location of the information apparatus on the network so that the reduced partial data and the address data are correlated with each other; second display means for displaying on the display screen the reduced partial data stored in the storage means; second designating means for designating the reduced partial data displayed on the display screen; second receiving means for receiving additional data related to the reduced partial data, from the information apparatus corresponding to the address data correlated with the reduced partial data designated by the second designating means; and third display means for displaying on the display screen the additional data received by the second receiving means.

According to a fourth aspect of the present invention, the foregoing objects have been achieved through provision of an information processing method including: a first receiving step of receiving input data from an information apparatus via a network; a first display step of displaying on a display screen the input data received in the first receiving step; a first designating step of designating an arbitrary region of the input data displayed on the display screen; an extracting step of extracting as partial data the region designated in the first designating step; a storing step of storing the partial data extracted in the extracting step and address data representing the location of the information apparatus on the network so that the partial data and the address data are correlated with each other; a second display step of displaying on the display screen the partial data stored in the storing step; a second designating step of designating the partial data displayed on the display screen;

a second receiving step of receiving additional data related to the partial data, from the information apparatus corresponding to the address data correlated with the partial data designated in the second designating step; and a third display step of displaying on the display screen the additional data received in the second receiving step.

According to a fifth aspect of the present invention, the foregoing objects have been achieved through provision of an information processing method including: a first receiving step of receiving input data from an information apparatus via a network; a first display step of displaying on a display screen the input data received in the first receiving step; a forming step of forming reduced data by reducing the input data displayed on the display screen; a storing step of storing the reduced data formed in the forming step and address data representing the location of the information apparatus on the network so that the reduced data and the address data are correlated with each other; a second display step of displaying on the display screen the reduced data stored in the storing step; a designating step of designating the reduced data displayed on the display screen; a second receiving step of receiving additional data related to the reduced data, from the information apparatus corresponding to the address data correlated with the reduced data designated in the designating step; and a third display step of displaying on the display screen the additional data received in the second receiving step.

According to a sixth aspect of the present invention, the foregoing objects have been achieved through provision of an information processing method including: a first receiving step of receiving input data from an information apparatus via a network; a first display step of displaying on a display screen the input data received in the first receiving step; a first designating step of designating an arbitrary region of the data displayed on the display screen; an extracting step of extracting as partial data the region designated in the first designating step; a forming step of forming reduced partial data by reducing the partial data extracted in the extracting step; a storing step of storing the reduced partial data formed in the forming step and address data representing the location of the information apparatus on the network so that the reduced partial data and the address data are correlated with each other; a second display step of displaying on the display screen the reduced partial data stored in the storing step; a second designating step of designating the reduced partial data displayed on the display screen; a second receiving step of receiving additional data related to the reduced partial data, from the information apparatus corresponding to the address data correlated with the reduced partial data designated in the second designating step; and a third display step of displaying on the display screen the additional data received in the second receiving step.

According to a seventh aspect of the present invention, the foregoing objects have been achieved through provision of a data-communication control program, stored in a storage medium, comprising the steps of: causing a computer to receive input data from an information apparatus via a network; causing the computer to display the received input data on a display screen; causing the computer to designate an arbitrary region of the input data displayed on the display screen; causing the computer to extract the designated region as partial data; causing the computer to store the extracted partial data and address data representing the location of the information apparatus on the network so that the extracted partial data and the address data are correlated with each other; causing the computer to display the stored partial data on the display screen; causing the computer to designate the partial data displayed on the display screen; causing the computer to receive additional data related to the partial data, from the information apparatus corresponding to the address data correlated to the designated partial data; and causing the computer to display the additional received data on the display screen.

According to an eighth aspect of the present invention, the foregoing objects have been achieved through provision of a data-communication control program, stored in a storage medium, comprising the steps of: causing a computer to receive input data from an information apparatus via a network; causing the computer to display the received input data on a display screen; causing the computer to form reduced data by reducing the input data displayed on the display screen; causing the computer to store the reduced data and address data representing the location of the information apparatus on the network so that the reduced data and the address data are correlated with each other; causing the computer to display the stored, reduced data on the display screen; causing the computer to designate the reduced data displayed on the display screen; causing the computer to receive additional data related to the reduced data, from the information apparatus corresponding to the address data correlated to the designated, reduced data; and causing the computer to display the received additional data on the display screen.

According to a ninth aspect of the present invention, the foregoing objects have been achieved through provision of a data-communication control program, stored in a storage medium, comprising the steps of: causing a computer to receive input data from an information apparatus via a network; causing the computer to display the received input data on a display screen; causing the computer to designate an arbitrary region of the input data displayed on the display screen; causing the computer to extract the designated region as partial data; causing the computer to form reduced partial data by reducing the extracted partial data; causing the computer to store the reduced partial data and address data representing the location of the information apparatus on the network so that the reduced partial data and the address data are correlated with each other; causing the computer to display the stored, reduced partial data on the display screen; causing the computer to designate the reduced partial data displayed on the display screen; causing the computer to receive additional data related to the reduced partial data, from the information apparatus corresponding to the address data correlated to the designated, reduced partial data; and causing the computer to display the received additional data on the display screen.

DESCRIPTION OF THE PREFERRED EMBODIMENT

The present invention is described below, with reference to the attached drawings.

An information processing apparatus according to a first embodiment of the present invention is described based on FIGS. 1 to 9.

Figure 1:
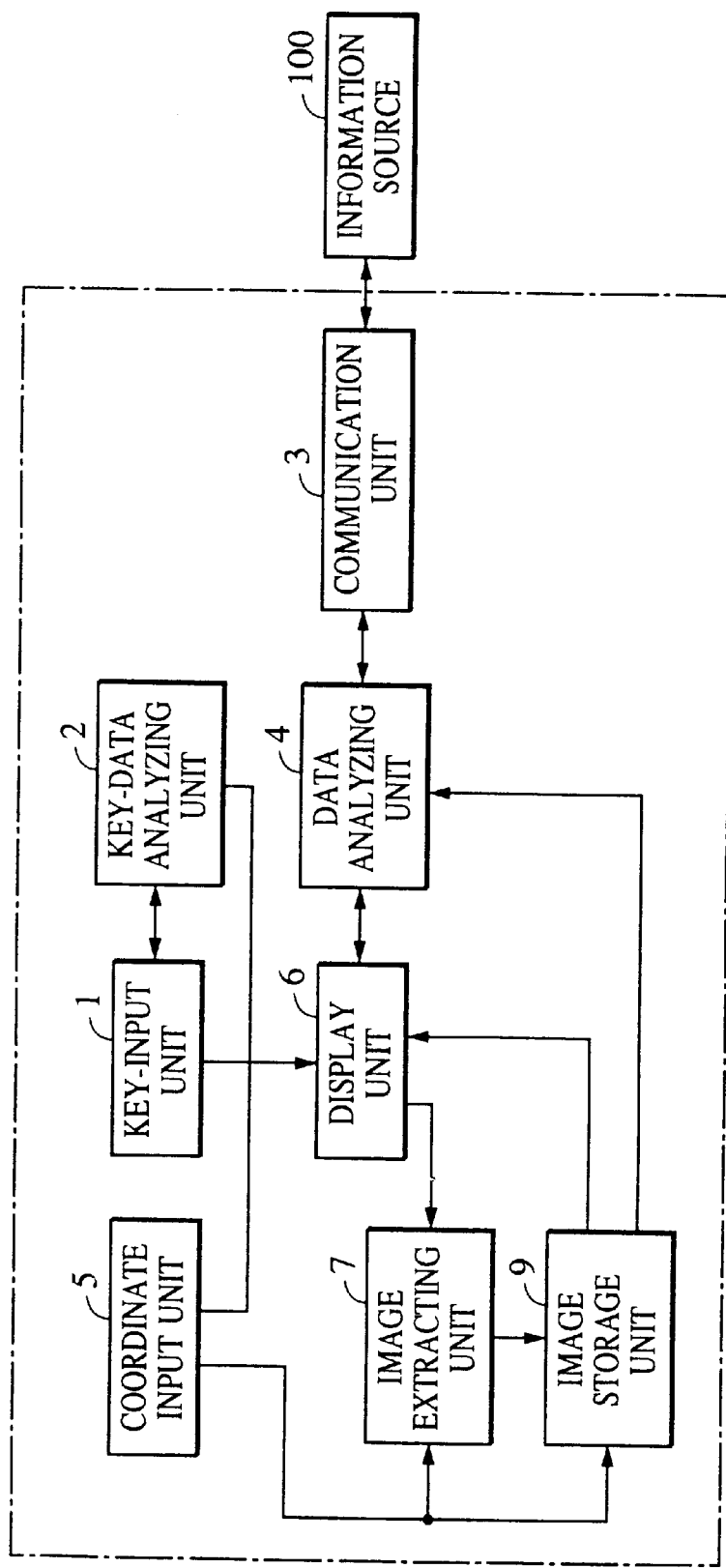
FIG. 1 is a block diagram showing an information processing apparatus according to a first embodiment of the present invention.

The information processing apparatus block diagram shown in FIG. 1, includes: a key-input unit 1; a key-input-data analyzing unit 2; a communication unit 3; a data analyzing unit 4; a coordinate input unit 5; a display unit 6; an image extracting unit 7; and an image storage unit 9.

The key-input unit 1 designates an information source 100 connected to a network, and is used to input commands. The key-input-data analyzing unit 2 analyzes data input with the key-input unit 1. The communication unit 3 performs data communication with the information source 100. The data analyzing unit 4 converts the data received by the communication unit 3 into display data, and analyzes data stored in the image storage unit 9 to perform data communication with the display unit 6 and the communication unit 3. The coordinate input unit 5 is used to input coordinates from a pointing device, and has the function of controlling a cursor and the function of drawing a rectangle indicating a region. The display unit 6 has display devices such as a CRT display and a liquid crystal display, which display windows, a selection menu, the cursor, data, and so forth. The image extracting unit 7 extracts part or all of an image on a screen. The image storage unit 9 stores image data from the image extracting unit 7. In other words, the image storage unit 9 stores the image data, to which network information concerning the information source 100 is added.

The functions of the data analyzing unit 4 is described in detail below. The data analyzing unit 4 has the function of adding the network information of the information source 100 to the image data extracted by the image extracting unit 7 so that the network information is correlated with the extracted image data, and the function of performing the steps of: designating the image data stored in the image storage unit 9 in order to extract the network information correlated with the image data; obtaining new data related to the image data from the information source 10 corresponding to the network information; and causing the display unit 6 to display the obtained data. These functions are executed in the processing indicated by the flowcharts shown in FIGS. 14 to 21 (described below). The flowcharts in FIGS. 14 to 21 are stored as programs in a memory in the data analyzing unit 4 or a separate storage medium (floppy disc or the like).

Figure 2:
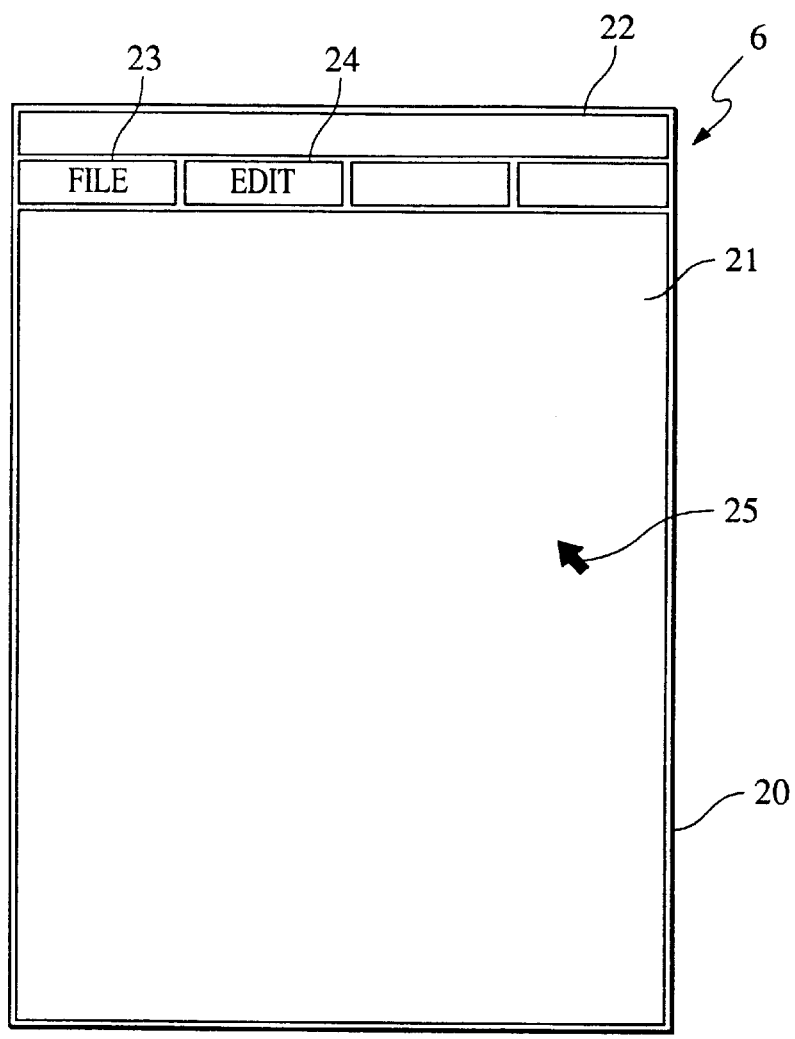
FIG. 2 is a schematic view showing a window in which data and a scrapbook are displayed.

When the programs (flowcharts shown in FIGS. 14 to 21 described below) according to the first embodiment of the present invention are activated, a data-display window 20 shown in FIG. 2 is displayed by the display unit 6. The data-display window 20 includes a region 21 for displaying input data obtained from the information source 100; a window title bar 22 used for the identification and moving of the window 20; menu command buttons 23 and 24 for selecting operation commands; and a cursor 25 that is moved so as to correspond to coordinates input from the coordinate input unit 5.

Next, processing according to the present invention is described below, with reference to FIGS. 2 to 9.

Figure 3:
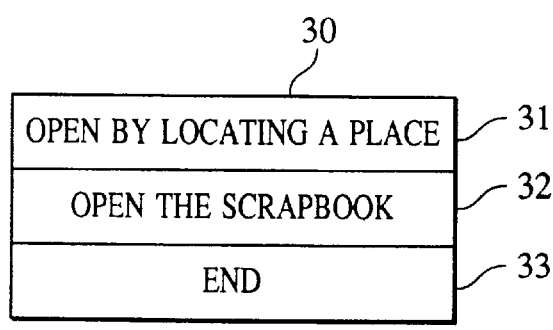
FIG. 3 is a schematic view showing a pull-down menu.
Figure 4:
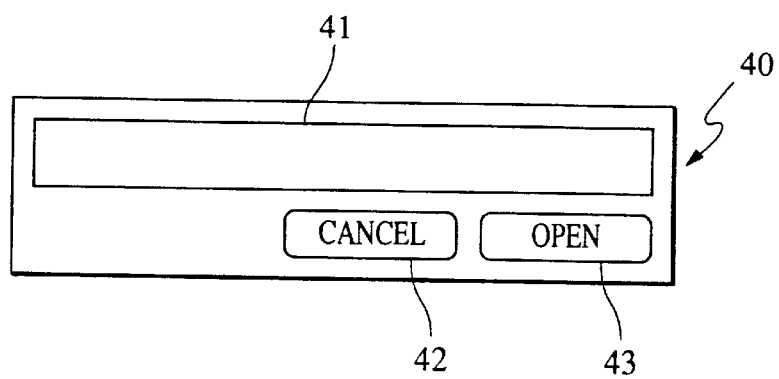
FIG. 4 is a schematic view showing a subwindow.

First, the case where input data received from the information source 100 are displayed is described, based on FIGS. 3 and 4. To receive input data from the information source 100, the cursor 25 shown in FIG. 2 is operated to select the menu command button 23. Based on this selection, a pull-down menu 30 shown in FIG. 3 is displayed under the menu command button 23. Among the items of the pull-down menu 30, "OPEN BY LOCATING A PLACE" is selected. Based on this selection, the pull-down menu 30 shown in FIG. 3 is erased before a subwindow 40 shown in FIG. 4 is displayed. In the subwindow 40, the place (network information) of the information source 100 is located.

The place is located with the key-input unit 1. For locating a place, Uniform Resource Locator (URL) notation is generally used. The URL input in this manner is displayed in a region 41. For stopping the operation, a cancel button 42 is selected to erase the subwindow 41. When an open button 43 is selected for proceeding with the operation, the subwindow 40 is erased, and the URL is evaluated by the data analyzing unit 4 before being transferred to the communication unit 3. The communication unit 3 issues a data-obtaining command to the information source 100. Concerning a communication protocol, it is common to use a hypertext transfer protocol (http).

When the input data are received from the information source 100 as described above, the received input data are transferred to the data analyzing unit 4. Since the received input data are written in a hypertext markup language (HTML), the data analyzing unit 4 analyzes the HTML, and issues text-displaying, image-drawing and graphics-displaying commands to the display unit 6 in accordance with the contents of the received input data. The display unit 6 performs displaying in accordance with the commands from the data analyzing unit 4.

Next, the case where a cutout of the input data displayed by the display unit 6 is stored in the image storage unit 9 is described, based on FIGS. 5 to 8.

Figure 5:
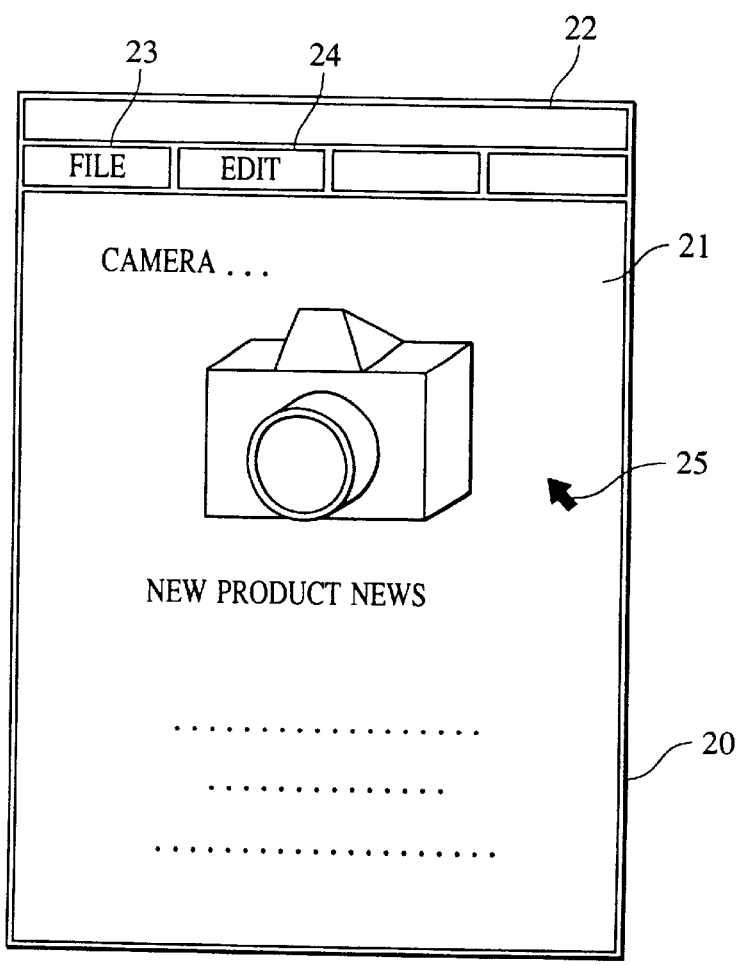
FIG. 5 is a schematic view showing a window in which data is being displayed.

FIG. 5 shows a condition of the display screen on which input data from the information source 100 are displayed. If an operator considers the displayed data to be useful and decides to subsequently open the data, a characteristic part of the data is cut out (extracted) and stored.

Figure 6:
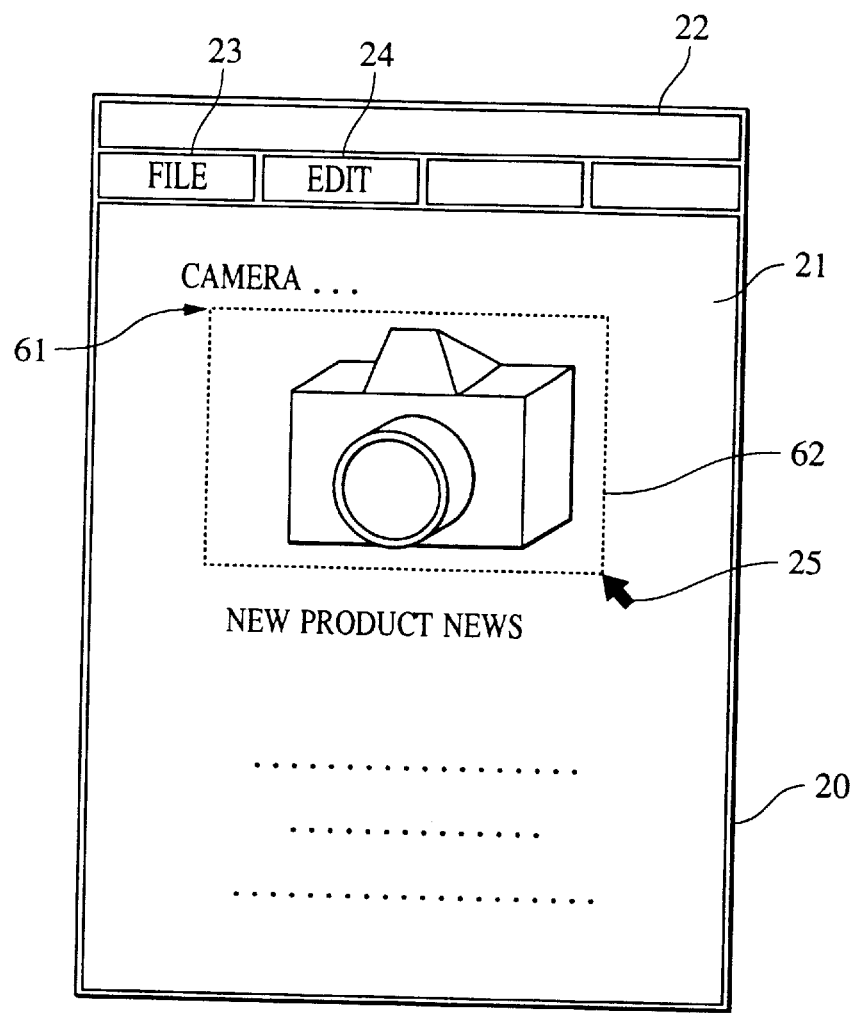
FIG. 6 is a schematic view showing a window in which a region is being selected.
Figure 7:
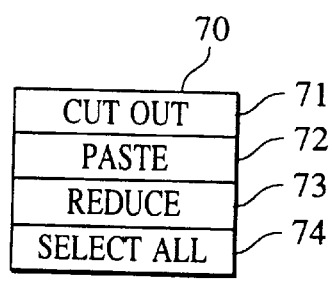
FIG. 7 is a schematic view showing a pull-down menu.

The cutout operation is performed such that, as shown in FIG. 6, a first coordinate point 61 of a part to be cut out is pointed to by the cursor 25 controlled by the coordinate input unit 5, and a second coordinate point 25 of the part is similarly pointed to. A rectangle 62 formed by two line segments orthogonally crossing at the first coordinate point and two line segments orthogonally crossing at the second coordinate point is termed a selected region. In this condition, the menu command button 24 (edit) is selected to display a pull-down menu 70 shown in FIG. 7, and among its items, "CUTOUT" 71 is selected. Based on this selection, the image of the region 62 is extracted by the image extracting unit 7.

For the operation of storing the extracted image, the menu command button 23 (file) is selected, and among the items of the pull-down menu 30 shown in FIG. 3, "OPEN THE SCRAPBOOK" is selected (The scrapbook has a design identical to that of the window 20 shown in FIG. 2, and the cutout image can be pasted on it). To paste the cutout image on the selected scrapbook, the menu command button 24 is selected, and among the items of the pull-down menu 70 shown in FIG. 7, "PASTE" 72 is selected. Based on this selection, the image of the region 62 extracted by the image extracting unit 7 is transferred to the display unit 6, and it is displayed as image 80 shown in FIG. 8. At the same time, the image data are correlated with the URL (network information) by the data analyzing unit 4, and are stored in the image storage unit 9.

Figure 9:
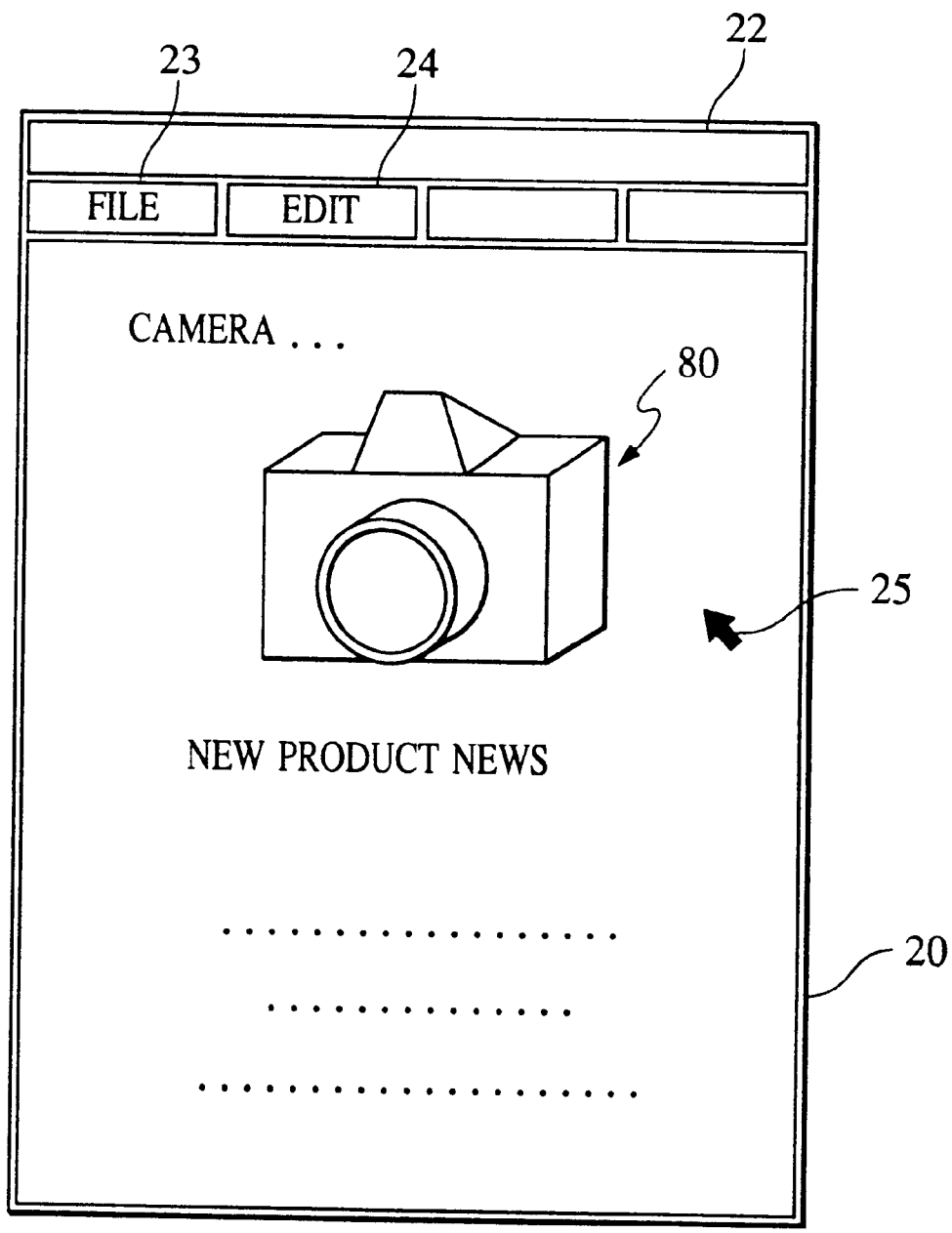
FIG. 9 is a schematic view showing a scrapbook display and the data display corresponding to an extracted partial image.

Next, the case where the image data stored so as to be correlated with the URL are used to acquire and display the information related to the image data from the information source 100 is described, based on FIG. 9.

When, from the image data on which the URL is pasted, the corresponding information source 100 is opened, if the scrapbook is not open, the menu command button 23 is selected, and among the items of the pull-down menu 30, "OPEN THE SCRAPBOOK" 32 is selected.

Figure 8:
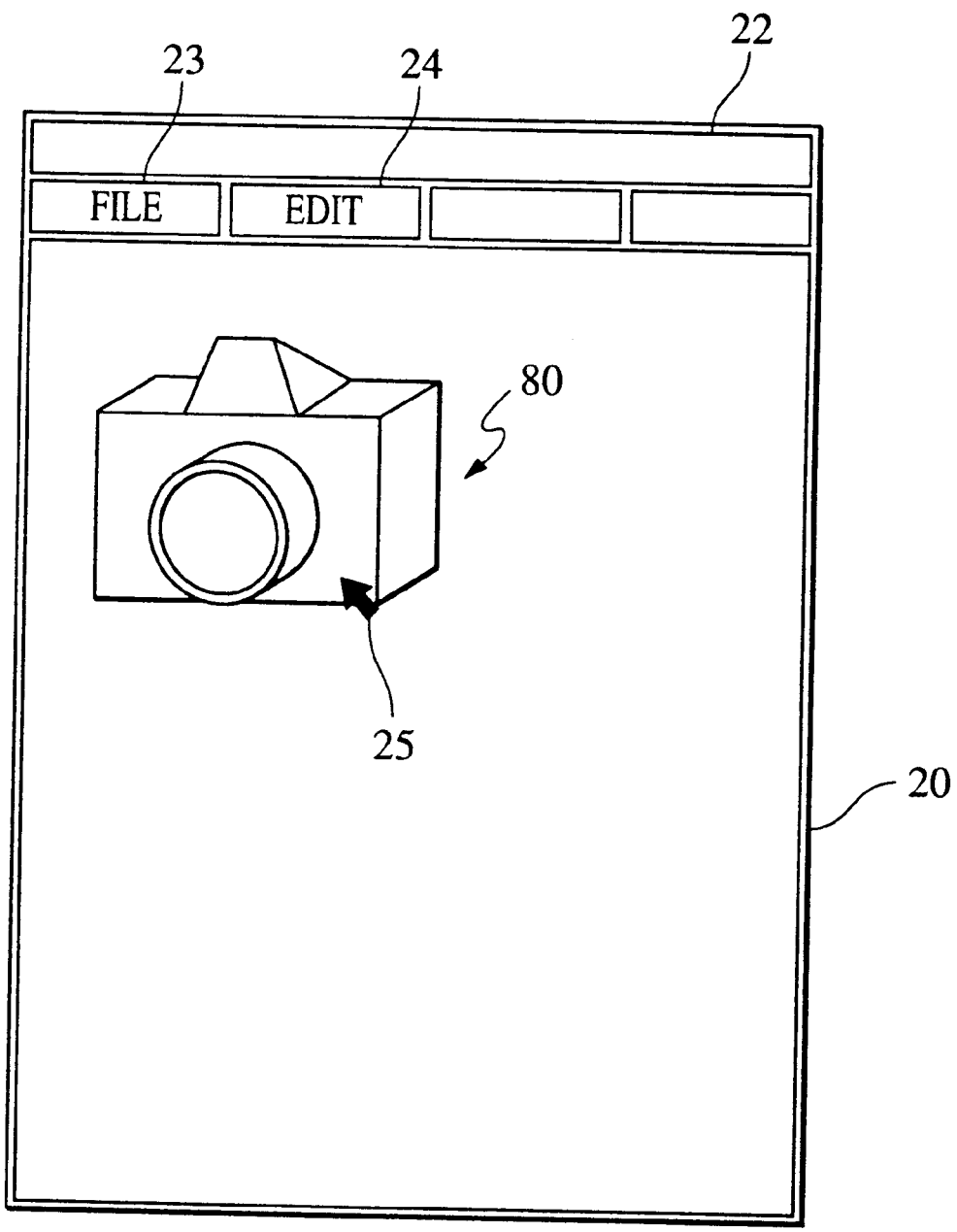
FIG. 8 is a schematic view showing a scrapbook display and the original data display corresponding to an extracted partial image.

Based on this selection, the URL-included image data stored in the image storage unit 9 are extracted and transferred to the display unit 6, so that the display condition shown in FIG. 8 appears. By using the cursor 25 controlled by the coordinate input unit 5 to designate the image data 80, the URL as well as the image data stored in the image storage unit 9 is extracted and transferred to the data analyzing unit 4.

The URL is evaluated by the data analyzing unit 4 before it is transferred to the communication unit 3. The communication unit 3 issues a data-obtaining command to the information source 100 for obtaining additional data. Based on this command, when the additional data from the information source 100 are received, the received additional data are transferred to the data analyzing unit 4. The data analyzing unit 4 analyzes the HTML, and issues text-displaying, image-drawing and graphics-drawing commands to the display unit 6 in accordance with the contents of the received additional data. The display unit 6 performs displaying in accordance with a command from the data analyzing unit 4, whereby displaying new data from the information source 100 as shown in FIG. 9.

An information processing apparatus according to a second embodiment of the present invention is described, based on FIGS. 10, 11A, 11B, 12A, 12B, 13A, and 13B.

Figure 10:
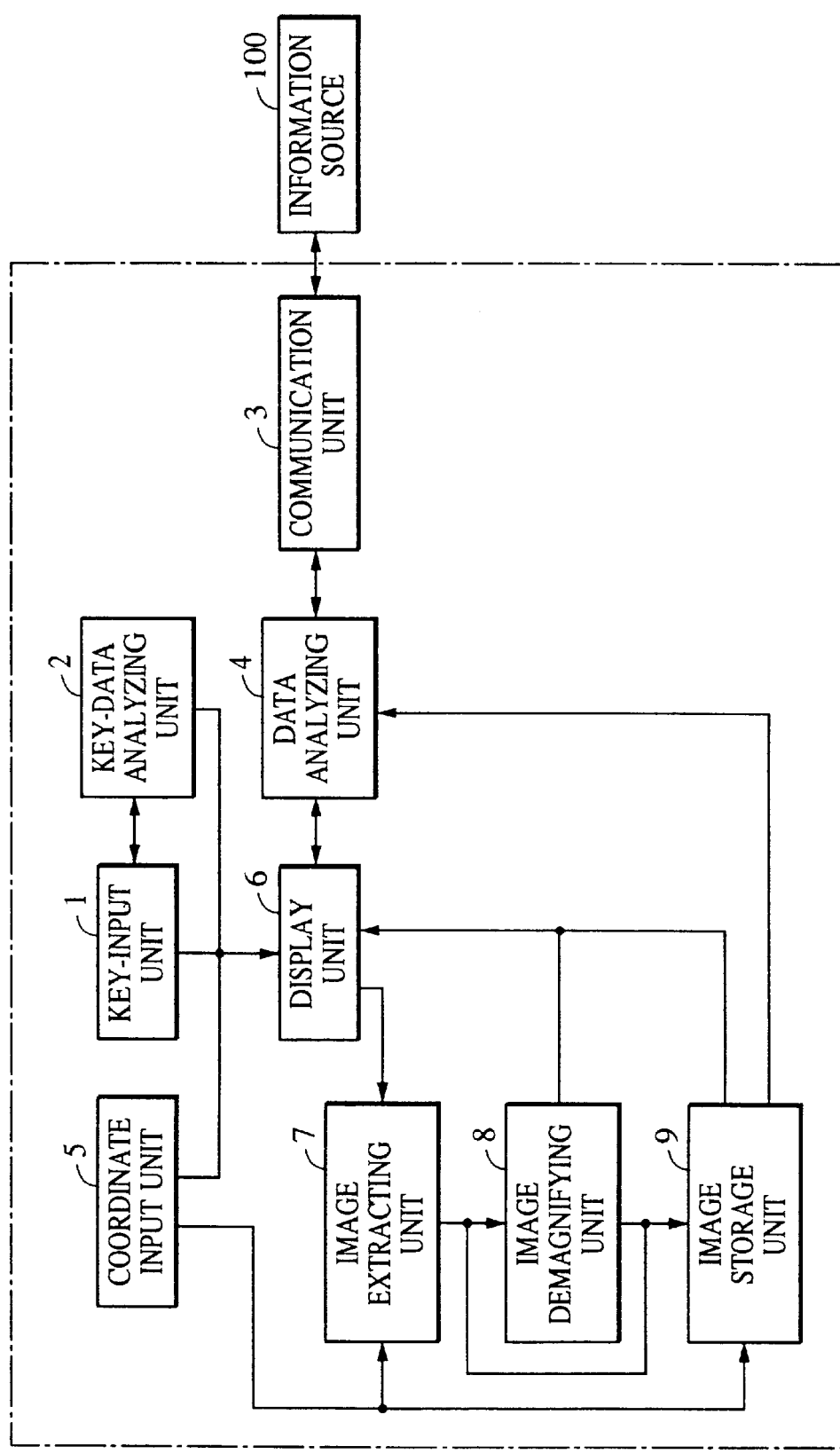
FIG. 10 is a block diagram of an information processing apparatus according to a second embodiment of the present invention.

FIG. 10 is a block diagram of the information processing apparatus. In the second embodiment, an image demagnifying unit 8 is additionally provided. The image demagnifying unit 8 has the function of using an arbitrary magnification to reduce image data extracted by an image extracting unit 7 and transferring the reduced image data to an image storage unit 9.

In the case where, when data received from an information source 100 is displayed in a data-display window (FIGS. 11A and 11B), an operator considers the data to be useful and cuts out the whole of the data in order to subsequently open the data, the structure of the information processing apparatus according to the second embodiment may be similarly formed to the above-described first embodiment of the present invention. However, if the operator does not wish to record the data in the original size in the scrapbook, it is possible to select the whole or part of the data before storing it in a reduced size.

Figure 11B:
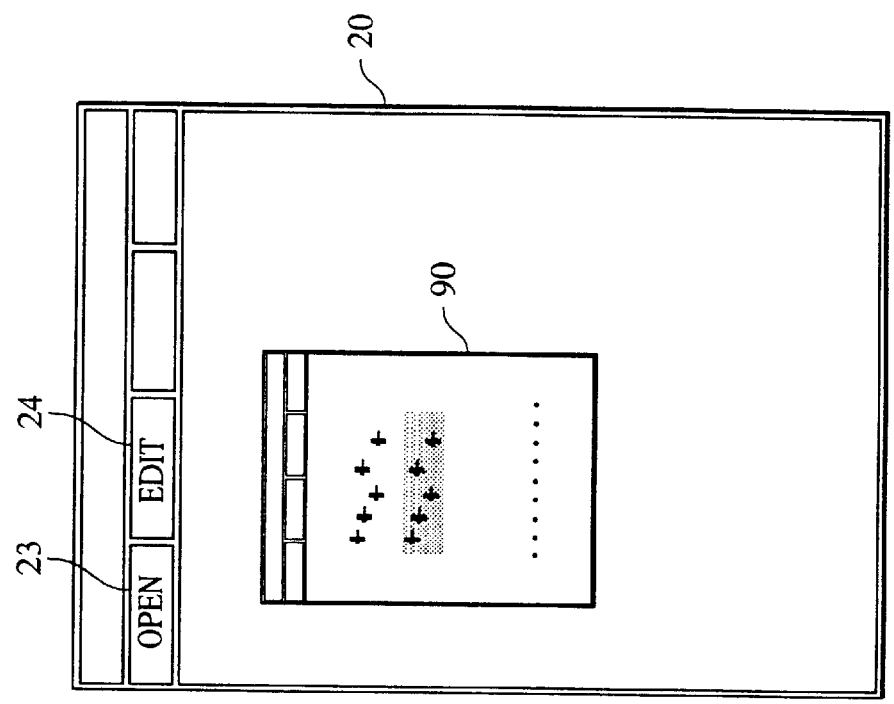
FIG. 11B is a schematic view showing a scrapbook display and a data display corresponding to a demagnified image.
Figure 11A:
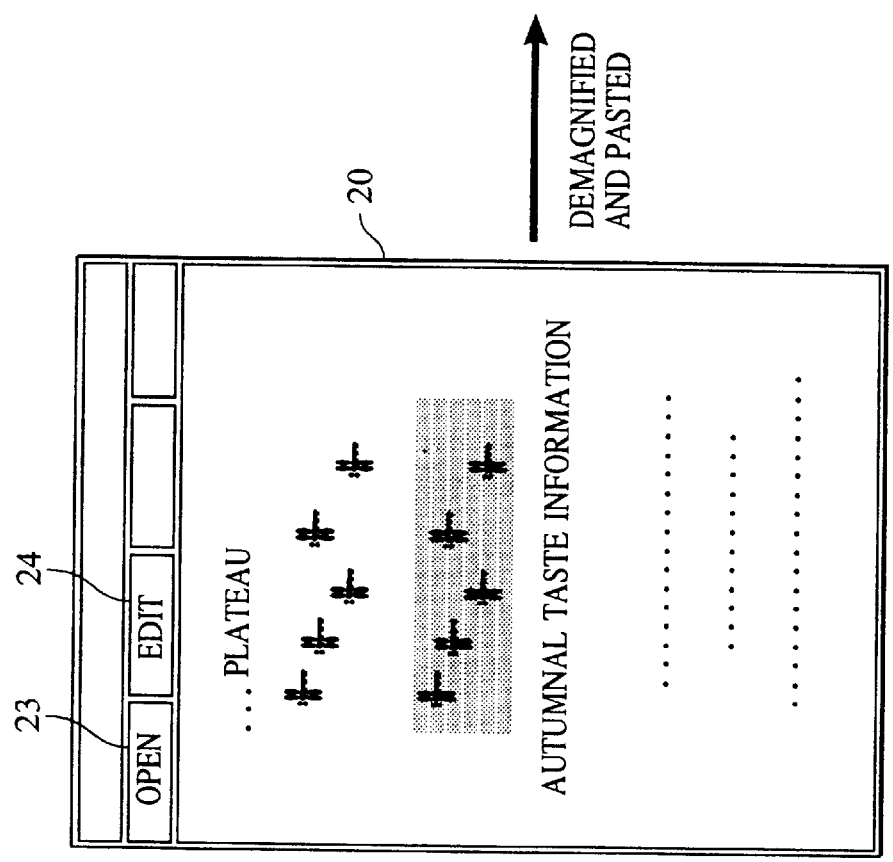
FIG. 11A is a schematic view showing a scrapbook display and a display of data corresponding to an extracted image before the data is reduced.

Accordingly, as shown in FIG. 11A, a menu command button 24 is selected, and among the items of the pull-down menu 70 shown in FIG. 5, "SELECT ALL" 74 is selected to designate all the data as a selected region. Based on this selection, the image of the selected region is extracted by the image extracting unit 7, and a predetermined demagnification (reduction) is used to demagnify (reduce) the extracted image. As shown in FIG. 6, with the rectangle 62 (surrounded by two line segments orthogonally crossing at the first coordinate point and two line segments orthogonally crossing at the second coordinate point) selected as shown in FIG. 6, the menu command button 24 is selected, and also when "REDUCTION" 73 is selected from the pull-down menu 70, the predetermined demagnification is used to demagnify the selected image.

The operation of storing the demagnified image is performed such that menu command button 23 shown in FIGS. 11A and 11B is selected and "OPEN THE SCRAPBOOK" 32 is selected from pull-down menu 32 shown in FIG. 3. To paste the demagnified image on the scrapbook, the menu command button 24 is selected, and "PASTE" 72 is selected from the pull-down menu 70. Based on this selection, as shown in FIG. 11B, a demagnified image 90 formed by the image demagnifying unit 8 is transferred to a display unit 6, and it is displayed. At the same time, the demagnified image 90 is correlated with a URL (network information) by the analyzing unit 4, and is stored in the image storage unit 9.

Next, the case where the demagnified image 90 stored so as to be correlated with the URL is used to acquire and display information related to the image data from an information source 100 is described, based on FIGS. 12A, 12B, 13A, and 13B.

When "OPEN THE SCRAPBOOK" 32 is selected, the demagnified image 90 stored in the image storage unit 9 is transferred to the display unit 6, and the URL stored together with the demagnified image 90 is transferred to and analyzed in a data analyzing unit 4 before being transferred to the communication unit 3. Subsequently, when latest (additional) data are received from the information source 100 corresponding to the URL, the received additional data are transferred to the data analyzing unit 4. The data analyzing unit 4 analyzes the HTML, and issues text-displaying, image-drawing and graphics-displaying commands to the display unit 6 in accordance with the contents of the received data. The display unit 6 performs displaying in accordance with the commands from the data analyzing unit 4, whereby new data from the information source 100 is displayed as shown in FIG. 11A.

Figure 12A:
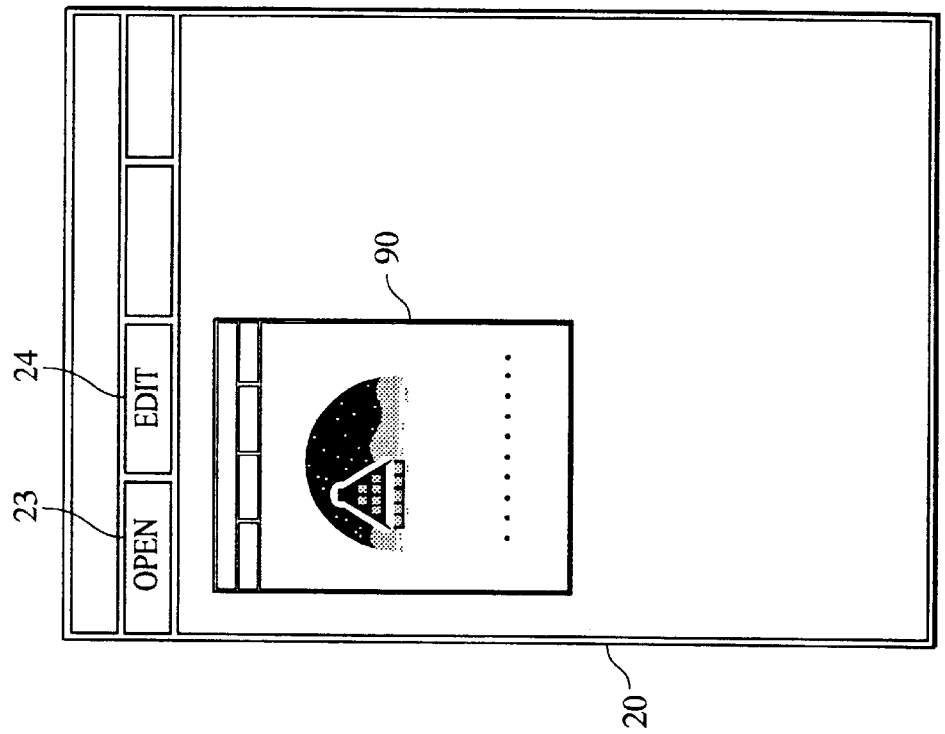
FIGS. 12A and 12B are schematic views showing scrapbook displays and data displays, respectively, corresponding to a demagnified image at different time points.
Figure 12B:
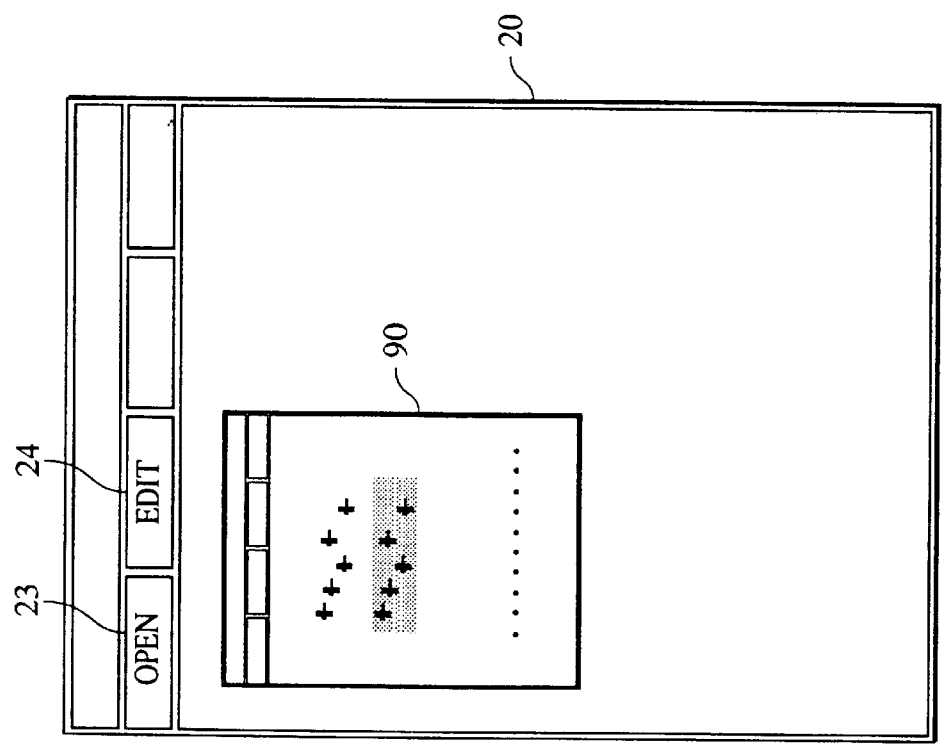

FIGS. 12A, 12B, 13A, and 13B show examples of latest (additional) data, received from the information source 100, which are displayed by the display unit 6. FIGS. 12A and 12B show a display screen condition obtained when the scrapbook is open, where data cut out from a certain information source 100 is pasted. In this case, the contents of the displayed additional data shown in FIGS. 12A and 12B differ because, when the scrapbook is opened, the data of the information source 100 have changed. On the display screen, a plurality of demagnified images can be simultaneously displayed.

Figure 13A:
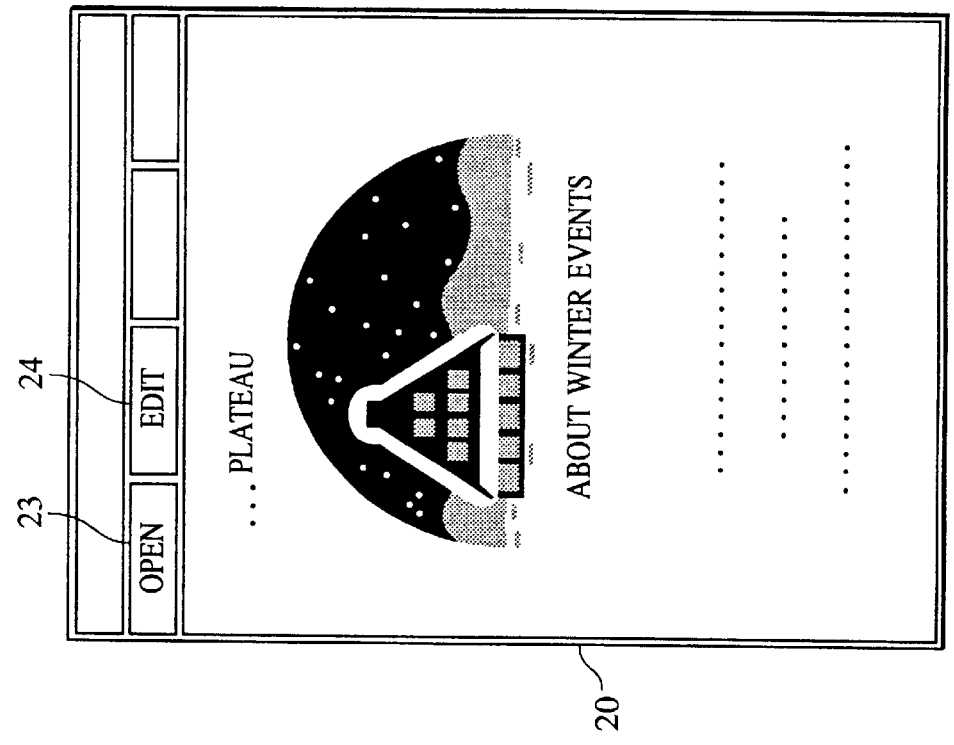
FIGS. 13A and 13B are scrapbook displays and data displays, respectively, corresponding to a demagnified image in different seasons of a year.
Figure 13B:
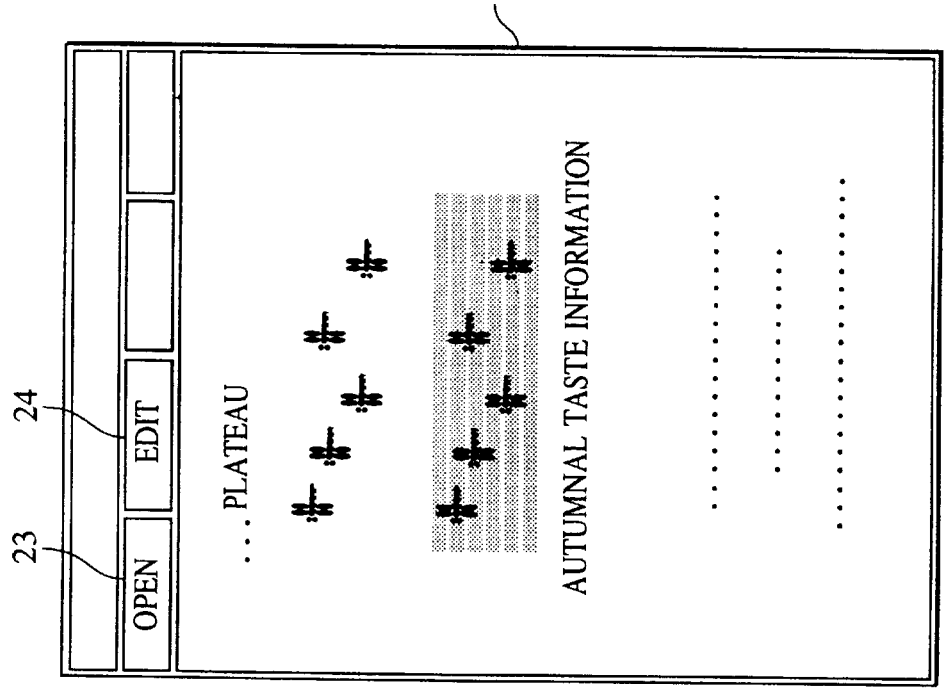

FIGS. 13A and 13B show data from an identical information source 100. In this case, the contents of information change depending on timing for opening the scrapbook, similarly to the cases shown in FIGS. 12A and 12B. Accordingly, the contents on the display screen differ as shown in FIGS. 13A and 13B.

Next, one example of a programmed process for enabling the first and second embodiments of the present invention is described, based on the flowcharts shown in FIGS. 14 to 21. This process enables the above-described first embodiment.

Figure 14:
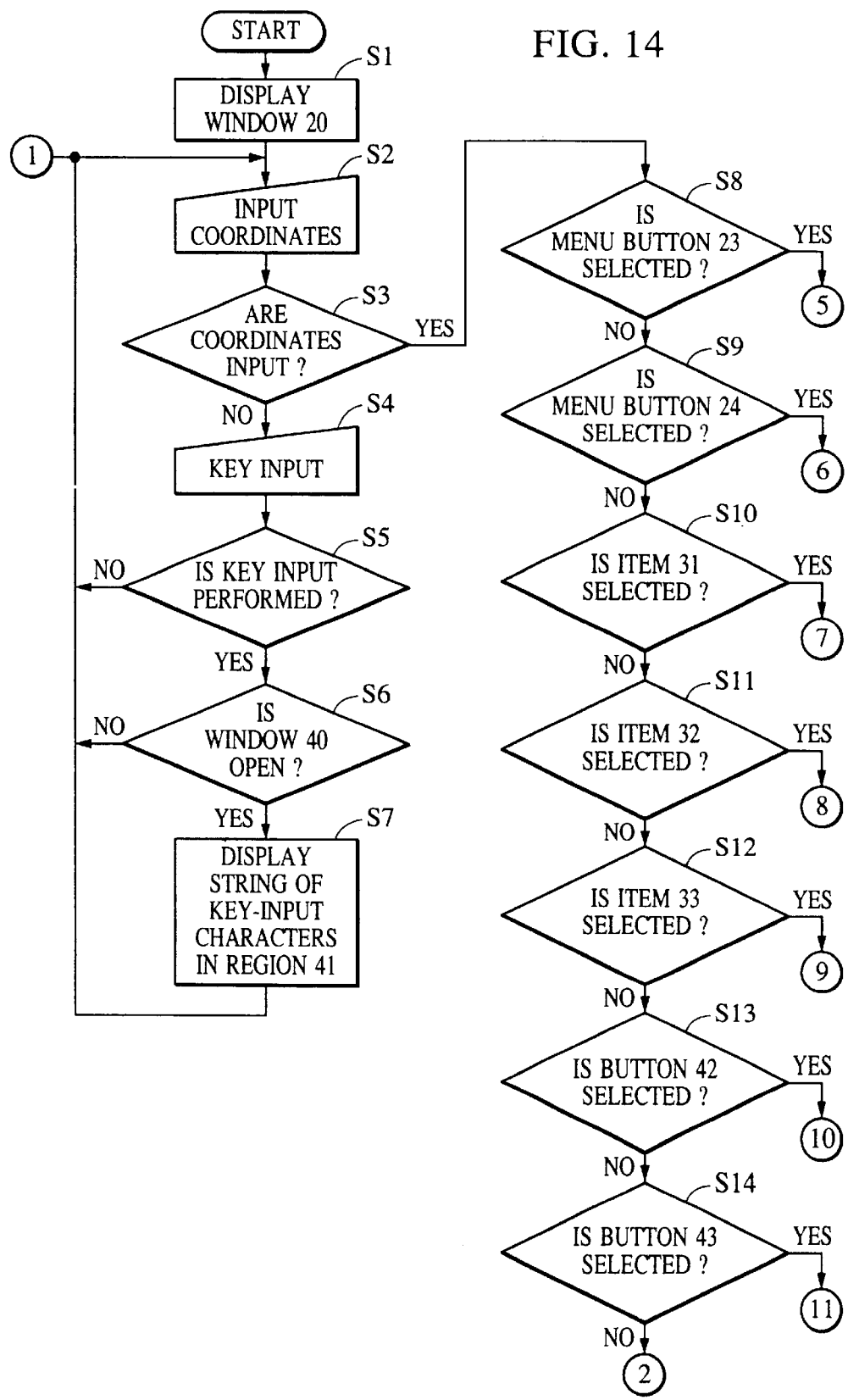
FIG. 14 is a flowchart of one process according to the present invention.
Figure 15:
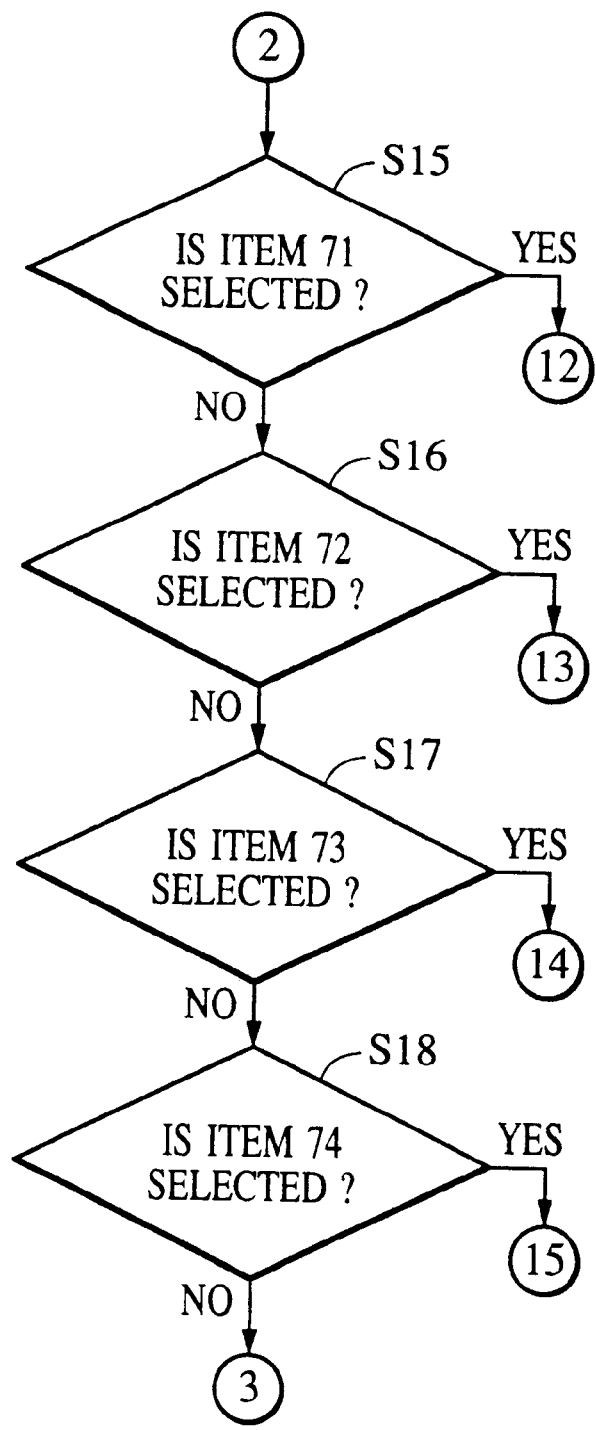
FIG. 15 is a flowchart of one process according to the present invention.
Figure 16:
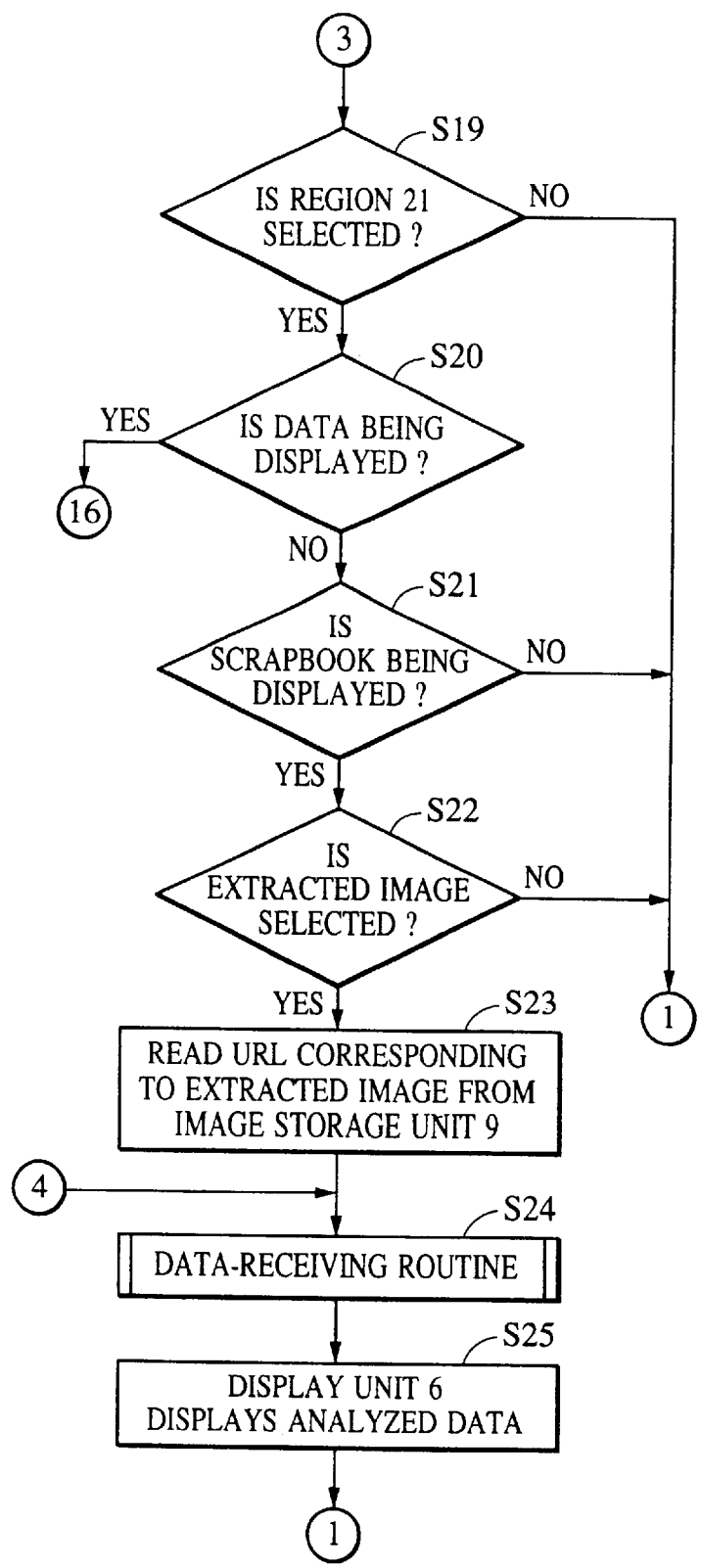
FIG. 16 is a flowchart of one process according to the present invention.

The flowchart shown in FIG. 14 is described.

In step S1, the window 20 is displayed.

In step S2, the inputting of coordinates from the coordinate input unit 5 is awaited.

In step S3, it is determined whether or not the coordinates are input. If the coordinates have been input, the process proceeds to step S8. If no coordinates have been input, key inputting from the key-input unit 1 is awaited in step S4, and in step S5, it is determined whether or not the key inputting has been performed. If no key inputting has been performed, the process returns to step S2, and key or coordinate inputting is awaited by repeatedly performing steps S2 to S5.

In step S5, if key inputting has been performed, in step S6, it is determined whether or not the subwindow 40 is open. If the subwindow 40 is not open, the process returns to step S2 since key inputting is not requested. If the subwindow 40 (FIG. 4) is open, the process proceeds to step S7, in which the input keys are displayed in the region 41 of the subwindow 40 before the process returns to step S2.

In step S8, it is determined whether or not the input coordinates represent a position on the menu command button 23. If the input coordinates represent a position on the menu command button 23 (FIG. 5), the process proceeds to step S32 shown in FIG. 18A. If the input coordinates do not represent a position on the menu command button 23, the process proceeds to step S9.

In step S9, it is determined whether or not the input coordinates represent a position on the menu command button 24. If the input coordinates represent a position on the menu command button 24, the process proceeds to step S33 shown in FIG. 18B. If the input coordinates do not represent a position on the menu command button 24, the process proceeds to step S10.

In step S10, it is determined whether or not the input coordinates represent a position on the item 31 of the pull-down menu 30. If the input coordinates represent a position on the item 31, the process proceeds to step S34 shown in FIG. 18C. If the input coordinates do not represent a position on the item 31, the process proceeds to step S11.

In step S11, it is determined whether or not the input coordinates represent a position on the item 32 of the pull-down menu 30. If the input coordinates represent a position on the item 32, the process proceeds to step S26 shown in FIG. 17. If the input coordinates do not represent a position on the item 32, the process proceeds to step S12.

In step S12, it is determined whether or not the input coordinates represent a position on the item 33 of the pull-down menu 30. If the input coordinates represent a position on the item 33, the process proceeds to step S35 shown in FIG. 18D. If the input coordinates do not represent a position on the item 33, the process proceeds to step S13.

In step S13, it is determined whether or not the input coordinates represent a position on the "CANCEL" button 42 in the subwindow 40. If the input coordinates represent a position on the button 42, the process proceeds to step S36 shown in FIG. 18E. If the input coordinates do not represent a position on the button 42, the process proceeds to step S14.

In step S14, it is determined whether or not the input coordinates represent a position on the "OPEN" button 43 in the subwindow 40. If the input coordinates represent a position on the button 43, the process proceeds to step S37 shown in FIG. 19A, in which the URL in the region 41 is extracted. If the input coordinates do not represent a position on the button 43, the process proceeds to step S15 shown in FIG. 15.

In step S15, it is determined whether or not the input coordinates represent a position on the item 71 of the pull-down menu 70. If the input coordinates represent a position on the item 71, the process proceeds to step S38 shown in FIG. 19B, in which the selected region is extracted. If the input coordinates do not represent a position on the item 71, the process proceeds to step S16.

In step S16, it is determined whether or not the input coordinates represent a position on the item 72 of the pull-down menu 70. If the input coordinates represent a position on the item 72, the process proceeds to step S39 shown in FIG. 19C, in which the extracted image data and URL are stored. If the input coordinates do not represent a position on the item 72, the process proceeds to step S17.

In step S17, it is determined whether or not the input coordinates represent a position on the item 73 of the pull-down menu 70. If the input coordinates represent a position on the item 73, the process proceeds to step S40 shown in FIG. 19D, in which the extracted image is demagnified. If the input coordinates do not represent a position on the item 73, the process proceeds to step S18.

In step S18, it is determined whether or not the input coordinates represent a position on the item 74 of the pull-down menu 40. If input coordinates represent a position on the item 74, the process proceeds to step S74 shown in FIG. 19E, in which the entire region 21 is selected. If the input coordinates do not represent a position on the item 74, the process proceeds to step S19 shown in FIG. 16.

In step S19, it is determined whether or not the input coordinates represent a position on the region 21 in the window 20. If the input coordinates represent a position on the region 21, the process proceeds to step S20. If the input coordinates do not represent a position on the region 21, the process returns to step S2 (FIG. 14).

In step S20, it is determined whether or not data are being displayed. If the data are being displayed, the process proceeds to step S42 shown in FIG. 20.

If the data are not being displayed, the process proceeds to step S21, in which it is determined whether or not the scrapbook is being displayed. If the scrapbook is not being displayed, the process returns to step S2 since nothing is displayed in the window 20. If the scrapbook is being displayed, the process proceeds to step S22, in which it is determined whether or not the input coordinates represent a position on the extracted image. If the input coordinates do not represent a position on the extracted image, the process returns to step S2. If the input coordinates represent a position on the extracted image, the process proceeds to step S23, in which the URL corresponding to the extracted image used for the determination in step S22 is read from the image storage unit 9 as shown in step S37 of FIG. 19A before the process proceeds to step S24 shown in FIG. 21.

Figure 21:
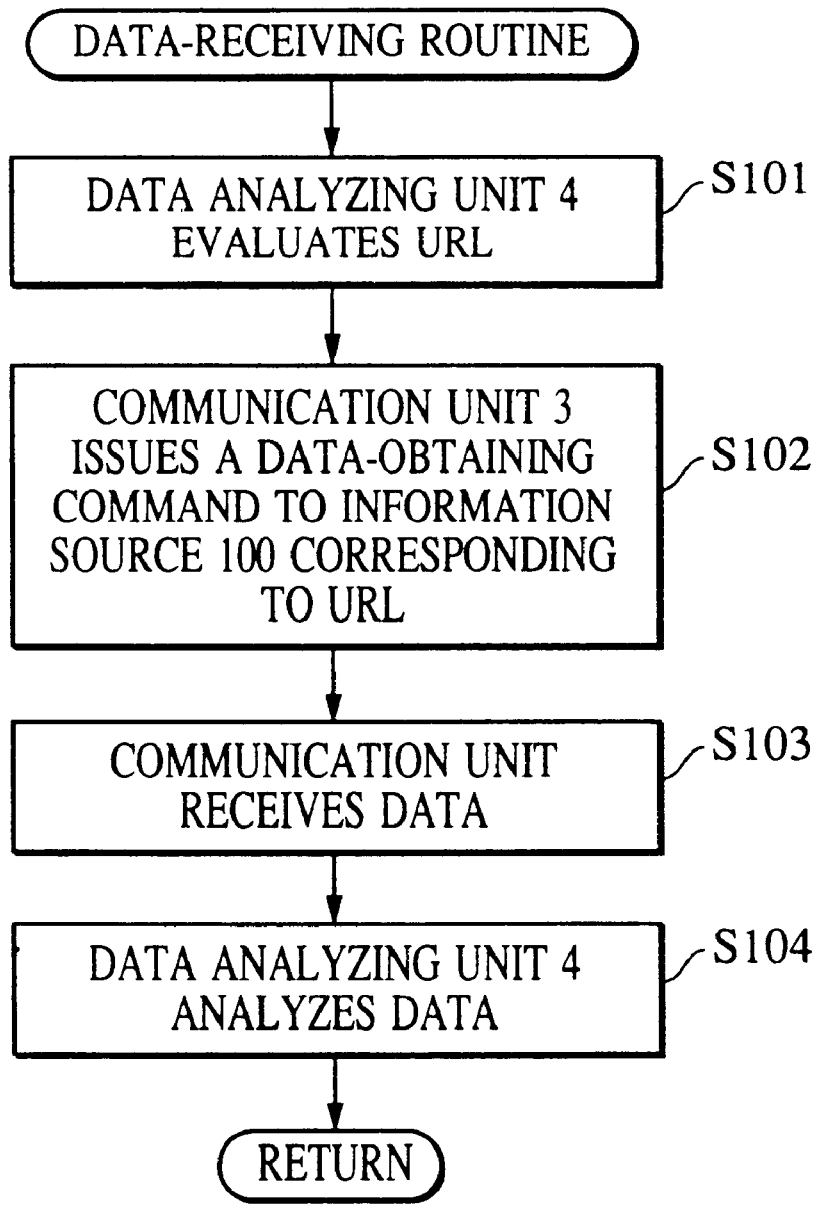
FIG. 21 is a flowchart of a data-receiving routine according to the present invention.

In step S24, the URL obtained in step S23 is used as a parameter to call a data-receiving routine shown in FIG. 21. The routine shown in FIG. 21 comprises the steps of: issuing a data-receiving command to the information source 100 corresponding to the URL; analyzing the obtained data; and returning the result (described below).

In step S25, the data obtained in step S24 is displayed in the window 20 before the process proceeds to step S2.

Figure 17:
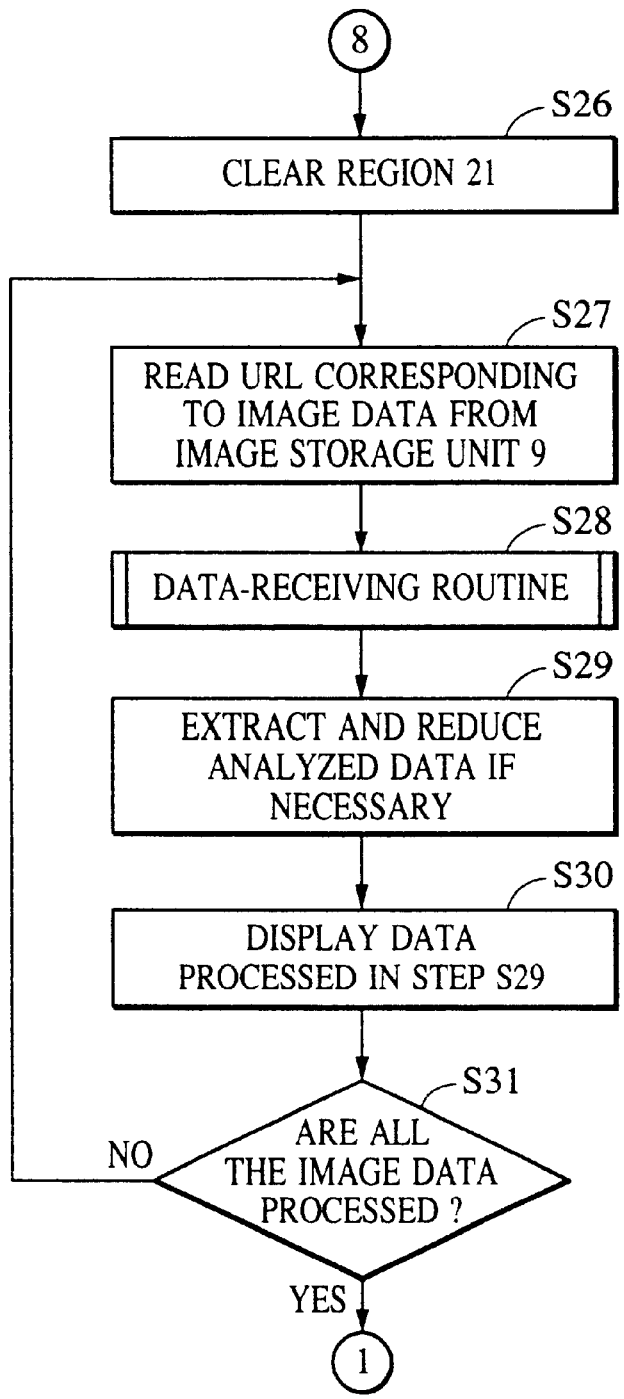
FIG. 17 is a flowchart of one process according to the present invention.
Figure 18A:
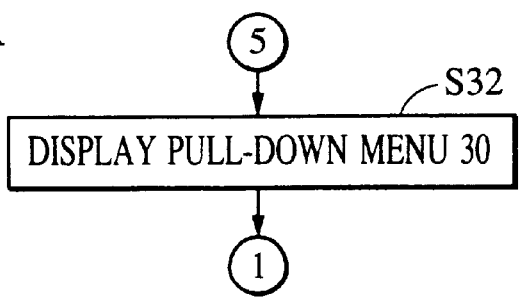
FIGS. 18A to 18E are flowcharts showing examples of processes according to the present invention.
Figure 18B:
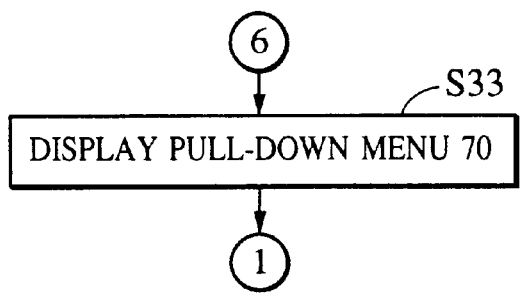
Figure 18C:
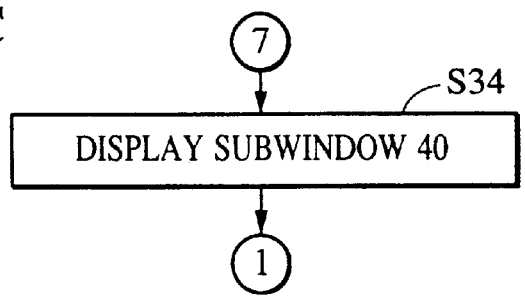
Figure 18D:
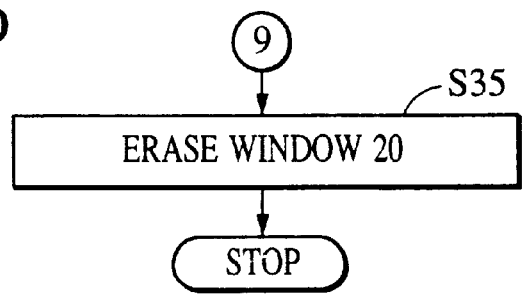
Figure 18E:
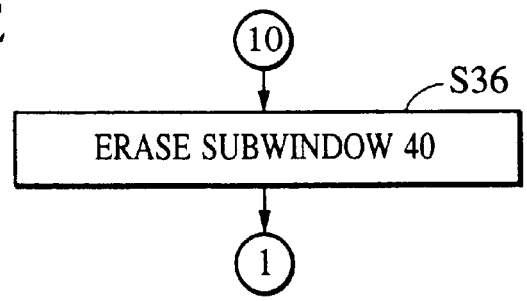
Figure 19A:
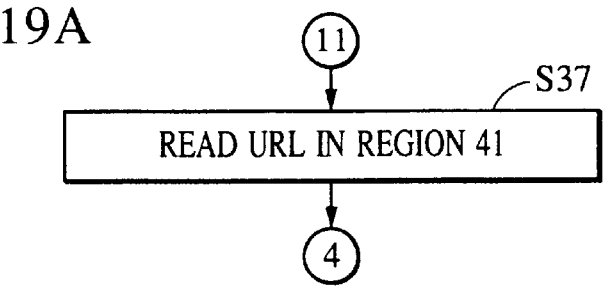
FIGS. 19A to 19E are flowcharts showing examples of processes according to the present invention.
Figure 19B:
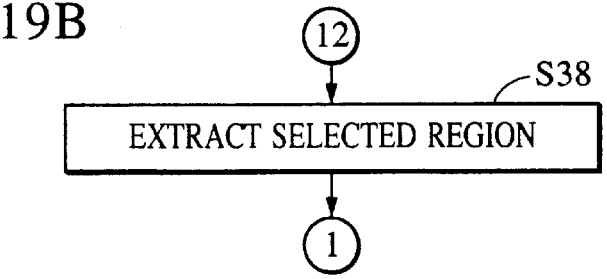
Figure 19C:
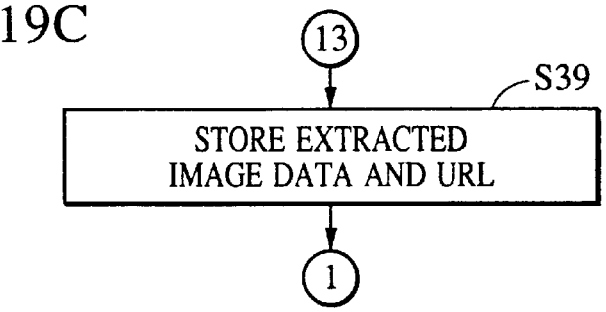
Figure 19D:
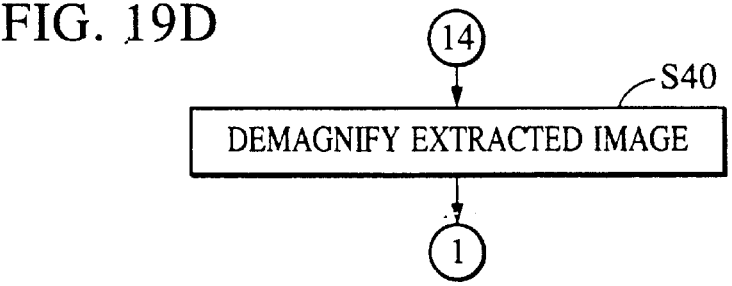
Figure 19E:
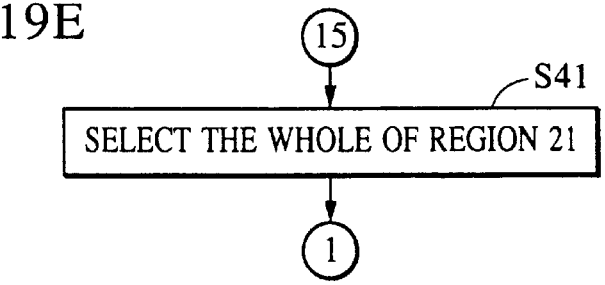

In steps S26 to S31 shown in FIG. 17, processing for opening the scrapbook is executed.

Initially, in step S26, the region 21 in the window 20 is cleared before the process proceeds to step S27.

In step S27, the URL stored in the image storage unit 9 is read.

In step S28, the URL obtained in step S27 is used as a parameter to call the data-receiving routine.

In step S29, based on the data obtained in step S28, in accordance with conditions for extraction stored in the image storage unit 9, partial image extraction or image demagnification is performed if necessary.

In step S30, the data processed in step S29 are displayed in the window 20.

In step S31, it is determined whether or not all the image data stored in the image storage unit 9 have been processed. If all the image data have not been processed, the process returns to step S27. If all the image data have been processed, the process returns to step S2.

In step S32 (FIG. 18A), the pull-down menu 30 is displayed before the process returns to step S2.

In step S33 (FIG. 18B), the pull-down menu 70 is displayed before the process returns to step S2.

In step S34 (FIG. 18C), the subwindow 40 is displayed before the process returns to step S2.

In step S35 (FIG. 18D), the window 20 is erased, and the programs terminate.

In step S36 (FIG. 18E), the subwindow 40 is erased before the process returns to step S2.

As shown in FIGS. 19A to 19E, in step S37, the URL input in the region 41 is fetched before the process returns to step S4.

In step S38, the selected region is extracted by the image extracting unit 7 before the process returns to step S2.

In step S39, the extracted image, conditions used in the extraction, and the URL are stored before the process returns to step S2.

In step S40, the extracted image is demagnified by the image demagnifying unit 8.

In step S41, the whole of the region 21 is selected before the process returns to step S2.

Figure 20:
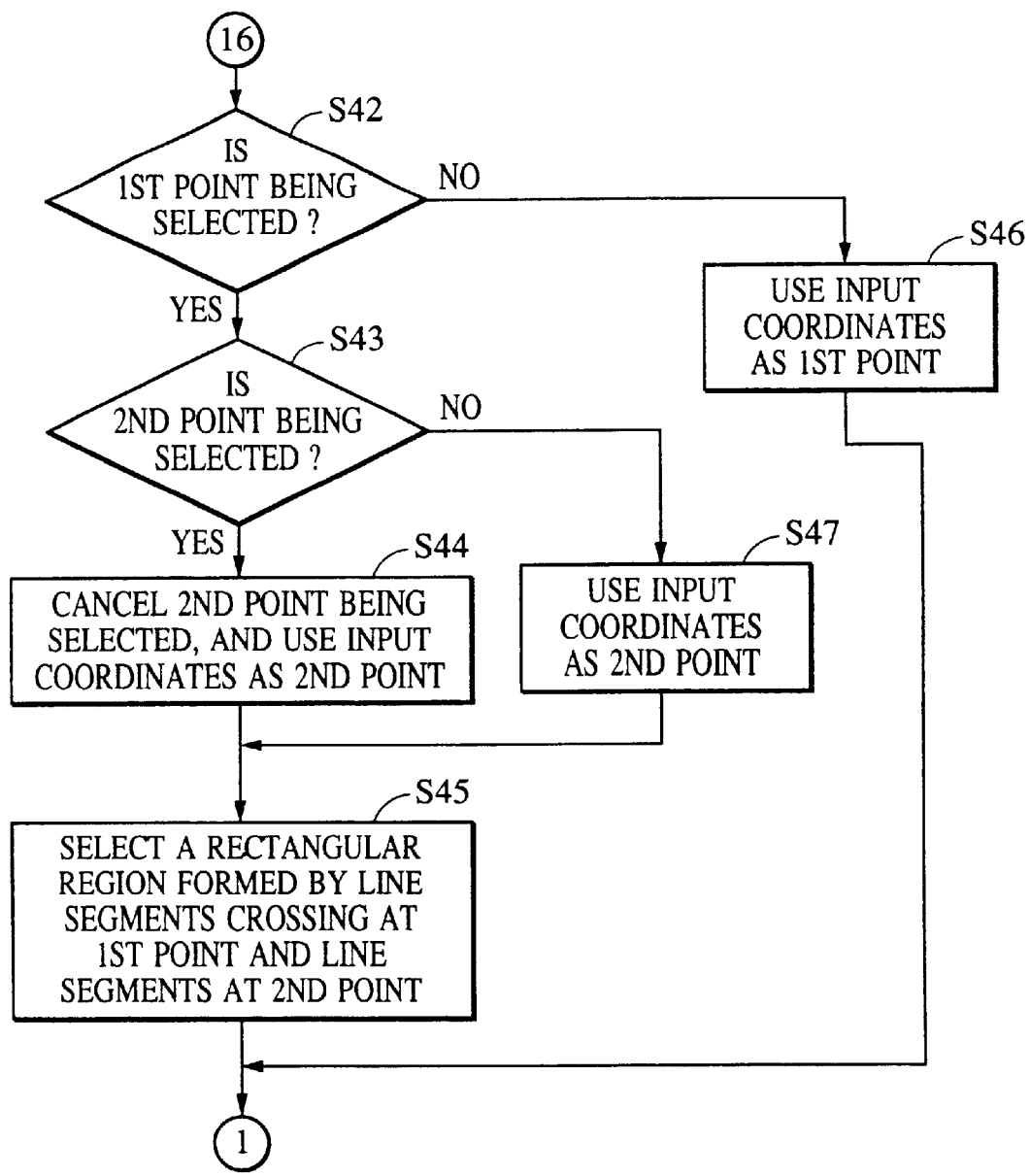
FIG. 20 is a flowchart of one process according to the present invention.

As shown in FIG. 20, in step S42, it is determined whether or not a first coordinate point is being selected. If the first coordinate point is not being selected, in step S42, the input coordinates are used as the first point, and the process returns to step S2. If the first coordinate point is being selected, the process proceeds to step S43, in which it is determined whether or not a second coordinate point is being selected. If the second point is not being selected, in step S47, the input coordinates are used as the second coordinate point, and the process proceeds to step S45. If the second coordinate point is being selected, the process proceeds to step S44, in which the second coordinate point being selected and the selected region are canceled before the process proceeds to step S45.

In step S45, a rectangular region formed by two line segments orthogonally crossing at the first coordinate point and two line segments orthogonally crossing at the second coordinate point is used as a selected region, and the process returns to step S2.

The data-receiving routine, shown in FIG. 21, is a subroutine that comprises the steps of: receiving a URL as a parameter; issuing a data-receiving command to the information source 100 corresponding to the URL; analyzing the obtained data; and returning the result.

Initially, in step S101, the URL is evaluated by the data analyzing unit 4 before the process proceeds to step S102.

In step S102, the communication unit 3 is used to issue a data-obtaining command to the information source 100 corresponding to the URL before the process proceeds to step S103.

In step S103, the communication unit 3 is used to receive data from the information source 100.

In step S104, the data obtained in step S103 are analyzed by the data analyzing unit 4, and are used as return data before the process returns.

According to the foregoing embodiments, a data analyzing means is used to correlate image data with network information (address) before the image data are stored in a storage means, and the stored image data is designated, whereby the network information corresponding to the designated image data is read and analyzed in a data analyzing means, so that data received from the information apparatus corresponding to the network information are displayed by a display means. Therefore, information from the information apparatus is visually recognized by implementing simple processing, whereby target information (homepage) is easily obtained.

According to the foregoing embodiments, extracted image data and network information (address) are stored so that they are correlated with each other before the data are reduced, whereby a large amount of image data can be stored, and a plurality of data can be simultaneously displayed since the reduced image data occupies a small area. Therefore, operation efficiency is improved.

What is claimed is:

1. An information processing apparatus comprising:

first receiving means for receiving data from an information apparatus via a network;

first display means for displaying on a display screen an image formed from the data received by said first receiving means;

first designating means for designating an arbitrary partial image from image displayed on the display screen;

extracting means for extracting the designated partial image;

storage means for storing the partial image extracted by said extracting means and address data representing the location of the data of said information apparatus on the network so that the partial image and the address data are correlated with each other;

second display means for displaying on the display screen the partial image stored in said storage means;

second designating means for designating the partial image displayed on the display screen;

second receiving means for receiving data from the information apparatus based on the address data correlated with the partial image by said second designating means; and third display means for displaying on the display screen an image formed from the data received by said second receiving means.

2. An information processing apparatus comprising:

first receiving means for receiving data from an information apparatus via a network;

first display means for displaying on a display screen an image formed from the data received by said first receiving means;

forming means for forming reduced image by reducing the image displayed on the display screen;

storage means for storing the reduced image formed by said forming means and address data representing the location of the data of said information apparatus on the network so that the reduced image and the address data are correlated with each other;

second display means for displaying on the display screen the reduced image stored in said storage means;

designating means for designating the reduced image displayed on the display screen;

second receiving means for receiving data from the information apparatus based on the address data correlated with the reduced image designated by said designating means; and third display means for displaying on the display screen an image formed from data received by said second receiving means.

3. An information processing apparatus according to claim 2, wherein said second display means simultaneously displays a plurality of reduced images stored in said storage means, and said designating means designates one of the plurality of reduced images.

4. An information processing apparatus comprising:

first receiving means for receiving data from an information apparatus vi a a network;

first display means for displaying on a display screen an image formed from the data received by said receiving means;

first designating means for designating an arbitrary partial image from the image displayed on the display screen;

extracting means for extracting the designated partial image;

forming means for storing reduced partial image by reducing the partial image extracted by said extracting means;

storage means for storing the reduced partial image formed by said forming means and address data representing the location of the data of said information apparatus on the network so that the reduced partial image and the address data are correlated with each other;

second display means for displaying on the display screen the reduced partial image stored in said storage means;

second designating means for designating the reduced partial image displayed on the display screen;

second receiving means for receiving data from the information apparatus based on the address data correlated with the reduced partial image designated by said second designating means; and third display means for displaying on the display screen an image formed from the data received by said second receiving means.

5. An information processing apparatus according to claim 4, wherein said second display means simultaneously displays a plurality of reduced partial images stored in said storage means on the display screen, and said second designating means designates one of the plurality of reduced partial images.

6. An information processing method comprising:

a first receiving step of receiving data from an information apparatus via a network;

a first display step of displaying on a display screen an image formed from the data received in said first receiving step;

a first designating step of designating an arbitrary partial image from image displayed on the display screen;

an extracting step of extracting the designated partial image;

a storage step of storing the partial image extracted in said extracting step and address data representing the location of the data of the information apparatus on the network so that the partial image and the address data are correlated with each other;

a second display step of displaying on the display screen the partial image stored in said storage step;

a second designating step of designating the partial image displayed on the display screen;

a second receiving step of receiving data from the information apparatus based on the address data correlated with the partial image in said second designating step; and a third display step of displaying on the display screen an image formed from the data received in said second receiving step.

7. An information processing method comprising:

a first receiving step of receiving data from an information apparatus via a network;

a first display step of displaying on a display screen an image formed from the data received in said first receiving step;

a forming step of forming reduced image by reducing the image displayed on the display screen;

a storage step of storing the reduced image formed in said forming step and address data representing the location of the data of the information apparatus on the network so that the reduced image and the address data are correlated with each other;

a second display step of displaying on the display screen the reduced image stored in said storage step;

a designating step of designating the reduced image displayed on the display screen;

a second receiving step of receiving data from the information apparatus based on the address data correlated with the reduced image designated in said designating step; and a third display step of displaying on the display screen an image formed from data received in said second receiving step.

8. An information processing apparatus according to claim 7, wherein said second display step includes simultaneously displaying a plurality of reduced images stored in said storage step, and said designating step includes designating one of the plurality of reduced images.

9. An information processing method comprising:
   a first receiving step of receiving data from an information apparatus via a network;
   a first display step of displaying on a display screen an image formed from the data received in said receiving step;
   a first designating step of designating an arbitrary partial image from the image displayed on the display screen;
   an extracting step of extracting the designated partial image;
   a forming step of storing reduced partial image by reducing the partial image extracted in said extracting step;
   a storage step of storing the reduced partial image formed in said forming step and address data representing the location of the data of the information apparatus on the network so that the reduced partial image and the address data are correlated with each other;
   a second display step of displaying on the display screen the reduced partial image stored in said storage step;
   a second designating step of designating the reduced partial image displayed on the display screen;
   a second receiving step of receiving data from the information apparatus based on the address data correlated with the reduced partial image designated in said second designating step; and
   a third display step of displaying on the display screen an image formed from the data received in said second receiving step.

10. An information processing method according to claim 9, wherein said second display step includes simultaneously displaying a plurality of reduced partial images stored in said storage step on the display screen, and said second designating step includes designating one of the plurality of reduced partial images.

11. A storage memory medium storing a computer-readable data communication control program for controlling an information process, the program comprising:
   a first receiving step of receiving data from an information apparatus via a network;
   a first display step of displaying on a display screen an image formed from the data received in said first receiving step;
   a first designating step of designating an arbitrary partial image from image displayed on the display screen;
   an extracting step of extracting the designated partial image;
   a storage step of storing the partial image extracted in said extracting step and address data representing the location of the data of the information apparatus on the network so that the partial image and the address data are correlated with each other;
   a second display step of displaying on the display screen the partial image stored in said storage step;
   a second designating step of designating the partial image displayed on the display screen;
   a second receiving step of receiving data from the information apparatus based on the address data correlated with the partial image in said second designating step; and
   a third display step of displaying on the display screen an image formed from the data received in said second receiving step.

12. A storage memory medium storing a computer-readable data communication control program for controlling an information process, the program comprising:
   a first receiving step of receiving data from an information apparatus via a network;
   a first display step of displaying on a display screen an image formed from the data received in said first receiving step;
   a forming step of forming reduced image by reducing the image displayed on the display screen;
   a storage step of storing the reduced image formed in said forming step and address data representing the location of the data of the information apparatus on the network so that the reduced image and the address data are correlated with each other;
   a second display step of displaying on the display screen the reduced image stored in said storage step;
   a designating step of designating the reduced image displayed on the display screen;
   a second receiving step of receiving data from the information apparatus based on the address data correlated with the reduced image designated in said designating step; and
   a third display step of displaying on the display screen an image formed from data received in said second receiving step.

13. A storage medium according to claim 12, wherein said second display step includes simultaneously displaying a plurality of reduced images stored in said storage step, and said designating step includes designating one of the plurality of reduced images.

14. A storage memory medium storing a computer-readable data communication control program for controlling an information process, the program comprising:
   a first receiving step of receiving data from an information apparatus via a network;
   a first display step of displaying on a display screen an image formed from the data received in said receiving step;
   a first designating step of designating an arbitrary partial image from the image displayed on the display screen;
   an extracting step of extracting the designated partial image;
   a forming step of storing reduced partial image by reducing the partial image extracted in said extracting step;
   a storage step of storing the reduced partial image formed in said forming step and address data representing the location of the data of the information apparatus on the network so that the reduced partial image and the address data are correlated with each other;
   a second display step of displaying on the display screen the reduced partial image stored in said storage step;
   a second designating step of designating the reduced partial image displayed on the display screen;
   a second receiving step of receiving data from the information apparatus based on the address data correlated with the reduced partial image designated in said second designating step; and
   a third display step of displaying on the display screen an image formed from the data received in said second receiving step.

15. A storage medium according to claim 14, wherein said second display step includes simultaneously displaying a plurality of reduced partial images stored in said storage step on the display screen, and said second designating step includes designating one of the plurality of reduced partial images.

16. A program product containing a computer-readable data communication control program for controlling an information process, the program comprising:

a first receiving step of receiving data from an information apparatus via a network;

a first display step of displaying on a display screen an image formed from the data received in said first receiving step;

a first designating step of designating an arbitrary partial image from image displayed on the display screen;

an extracting step of extracting the designated partial image;

a storage step of storing the partial image extracted in said extracting step and address data representing the location of the data of the information apparatus on the network so that the partial image and the address data are correlated with each other;

a second display step of displaying on the display screen the partial image stored in said storage step;

a second designating step of designating the partial image displayed on the display screen;

a second receiving step of receiving data from the information apparatus based on the address data correlated with the partial image in said second designating step; and a third display step of displaying on the display screen an image formed from the data received in said second receiving step.

17. A program product containing a computer-readable data communication control program for controlling an information process, the program comprising:

a first receiving step of receiving data from an information apparatus via a network;

a first display step of displaying on a display screen an image formed from the data received in said first receiving step;

a forming step of forming reduced image by reducing the image displayed on the display screen;

a storage step of storing the reduced image formed in said forming step and address data representing the location of the data of the information apparatus on the network so that the reduced image and the address data are correlated with each other;

a second display step of displaying on the display screen the reduced image stored in said storage step;

a designating step of designating the reduced image displayed on the display screen;

a second receiving step of receiving data from the information apparatus based on the address data correlated with the reduced image designated in said designating step; and a third display step of displaying on the display screen an image formed from data received in said second receiving step.

18. A program product according to claim 17, wherein said second display step includes simultaneously displaying a plurality of reduced images stored in said storage step, and said designating step includes designating one of the plurality of reduced images.

19. A program product containing a computer-readable data communication control program for controlling an information process, the program comprising:

a first receiving step of receiving data from an information apparatus via a network;

a first display step of displaying on a display screen an image formed from the data received in said receiving step;

a first designating step of designating an arbitrary partial image from the image displayed on the display screen;

an extracting step of extracting the designated partial image;

a forming step of storing reduced partial image by reducing the partial image extracted in said extracting step;

a storage step of storing the reduced partial image formed in said forming step and address data representing the location of the data of the information apparatus on the network so that the reduced partial image and the address data are correlated with each other;

a second display step of displaying on the display screen the reduced partial image stored in said storage step;

a second designating step of designating the reduced partial image displayed on the display screen;

a second receiving step of receiving data from the information apparatus based on the address data correlated with the reduced partial image designated in said second designating step; and a third display step of displaying on the display screen an image formed from the data received in said second receiving step.

20. A program product according to claim 19, wherein said second display step includes simultaneously displaying a plurality of reduced partial images stored in said storage step on the display screen, and said second designating step includes designating one of the plurality of reduced partial images.

* * * * *

UNITED STATES PATENT AND TRADEMARK OFFICE
CERTIFICATE OF CORRECTION

PATENT NO. : 6,262,731 B1
DATED : July 17, 2001
INVENTOR(S) : Taketo Hasegawa

It is certified that error appears in the above-identified patent and that said Letters Patent is hereby corrected as shown below:

Column 4,
Line 5, "additional" should read -- additionally --.

Column 14,
Line 66, "apparatus" should read -- method --.

Column 13,
Line 46, "vi a" should read -- via --.

Signed and Sealed this

Thirtieth Day of April, 2002

Attest:

Attesting Officer

JAMES E. ROGAN
Director of the United States Patent and Trademark Office